UNITED STATES PATENT OFFICE.

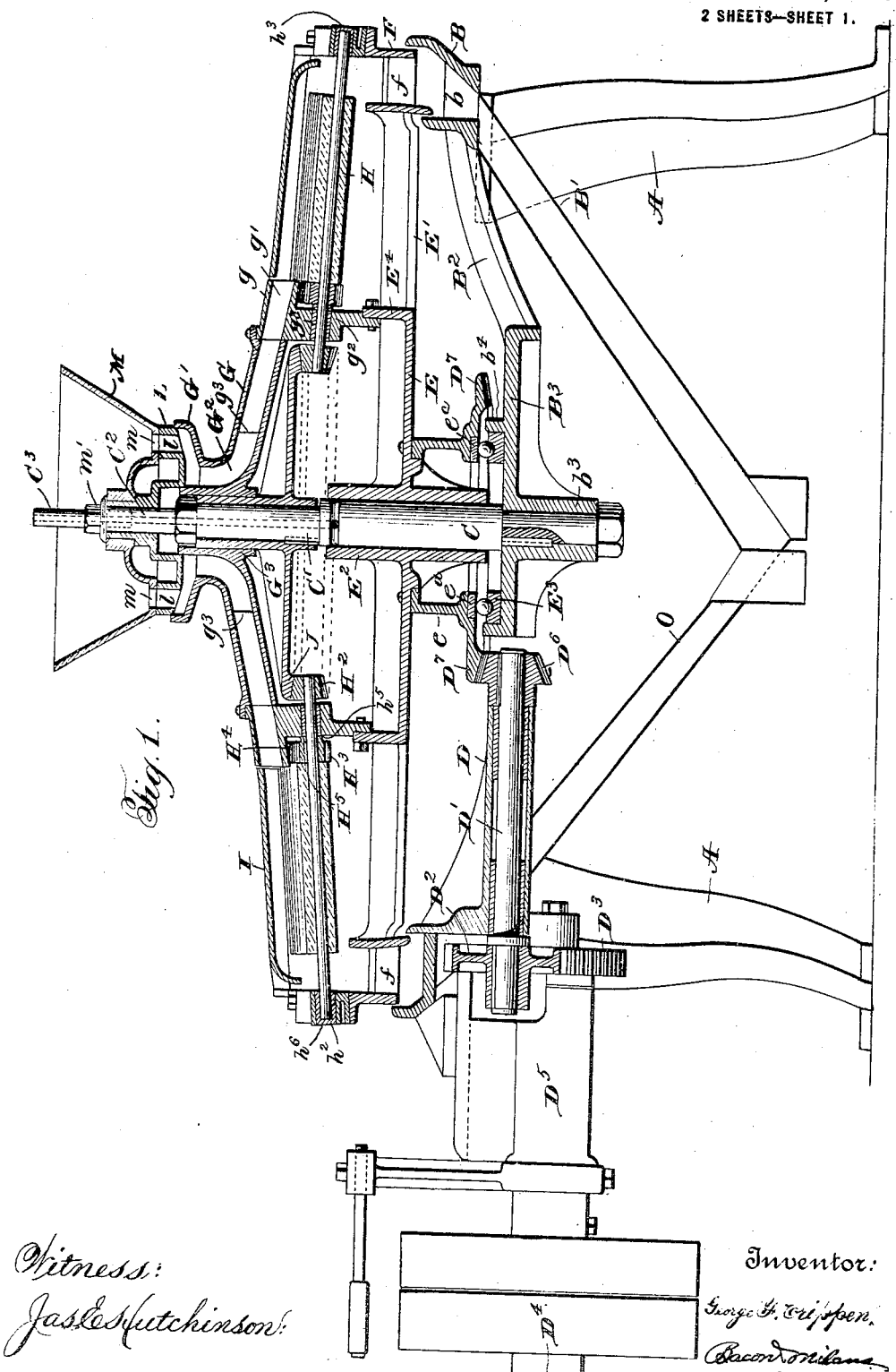

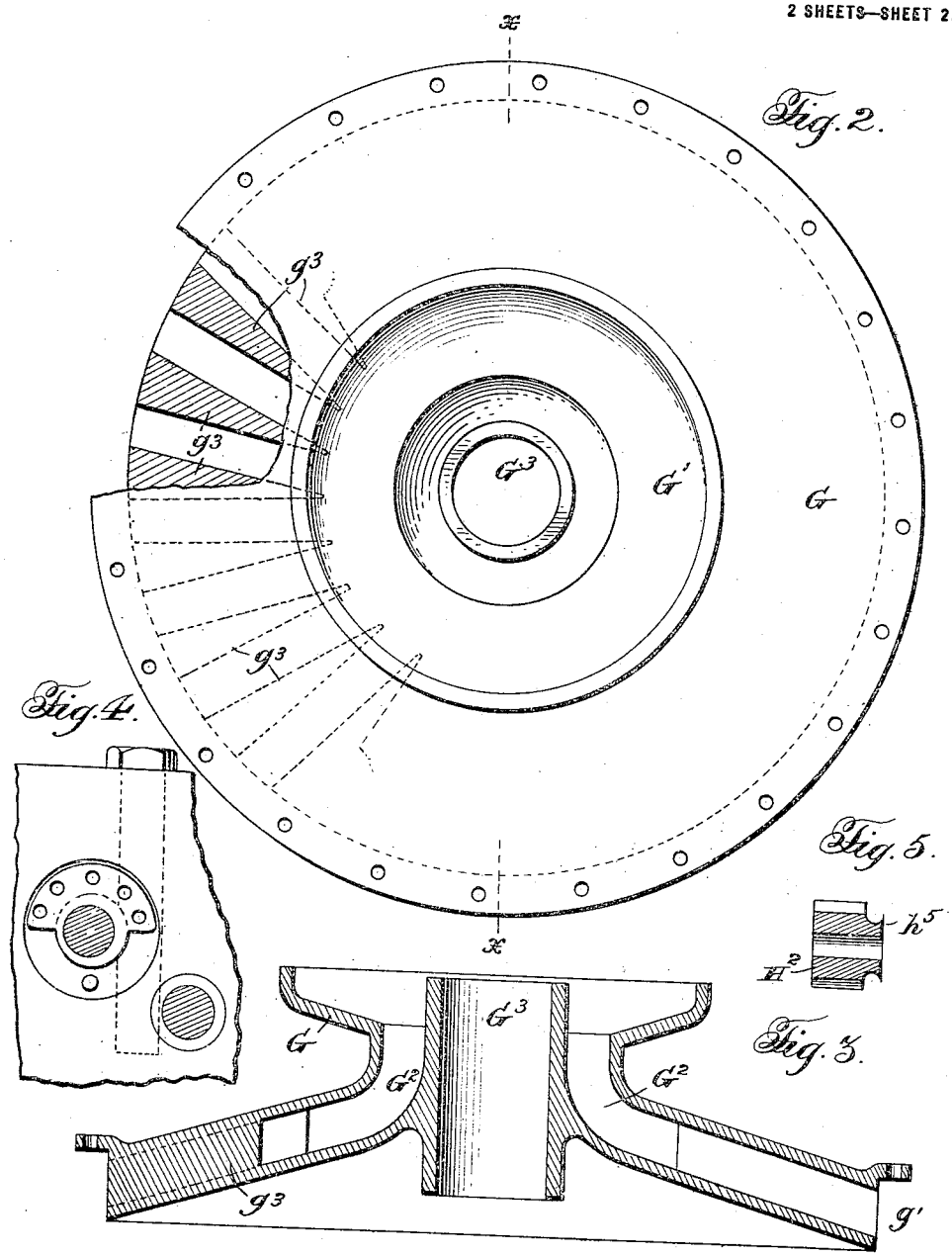

GEORGE F. CRIPPEN, OF YPSILANTI, MICHIGAN.

MACHINE FOR SEPARATING SEEDS.

1,257,320.  Specification of Letters Patent.  Patented Feb. 26, 1918.

Application filed December 1, 1916. Serial No. 134,381.

*To all whom it may concern:*

Be it known that I, GEORGE F. CRIPPEN, a citizen of the United States, residing at Ypsilanti, in the county of Washtenaw and State of Michigan, have invented certain new and useful Improvements in Machines for Separating Seeds, of which the following is a specification, reference being had therein to the accompanying drawing.

This invention relates to an improved machine for separating foreign material and imperfect seeds from perfect seeds. The invention is applicable and especially designed for use in connection with treating beans, peas, etc.

Heretofore it has been suggested and machines have been produced for the purpose of separating imperfect seeds and foreign substances from the bulk of seeds, as for instance beans, and centrifugal force has been resorted to as a primary means for causing the seeds to pass forcibly over soft or rubber coated picking rolls.

A structure of that character is represented in my Patent No. 937695, dated Oct. 19, 1909. The present invention has to do with machines of this general character but involves principles different from those disclosed in the said patent and primarily dispenses largely with the necessity of using centrifugal force as a material or substantial factor in the treatment of the material.

The present invention also contemplates a structure, original in its general characteristics, possessing features of novelty and combinations of elements whereby a picking machine or cleaning machine is produced which is different from any machines which have heretofore been made.

The object of the present invention is to provide a machine which will have a minimum number of operative parts, will possess features which will render the machine inexpensive in operation, effective for the purposes intended, one wherein very soft rubber may be employed in connection with the picking rolls and one wherein the feed as well as the movement of the seed is dependent largely upon the force of gravity.

A machine embodying the present invention is illustrated in the accompanying drawing but it is to be understood that various changes, alterations and modifications can be made without departing from the nature and principle of the invention.

In the drawings:

Figure 1 is a vertical central section through a machine embodying the invention showing parts in elevation;

Fig. 2 is a plan of the feed or seed distributing guide, showing parts broken away.

Fig. 3 is a sectional elevation of a part of the machine on the line $x$—$x$ of Fig. 2.

Fig. 4 is an elevation of the outer bearings for the picker rolls, and

Fig. 5 is a detail sectional view of a roll driving gear.

The bed of the machine is preferably composed of a casting having supporting legs A, and an annular or ring part B of channel formation, the bottom of the channel being open and communicating with a hopper B'. The two parts of the channel or ring member are united at intervals by cross webs $b$ so that the part represents substantially a cast or single piece unit. These may, however, be varied in any suitable manner and the parts may be made in sections if desired.

Extending inwardly from the channeled rim part are supporting arms $B^2$ carrying at their inner ends a platform $B^3$ having a centrally disposed bearing member $b^3$. In the bearing $b^3$ is keyed a vertically disposed shaft C, the same being properly stepped or shouldered to rest on the upper face of the platform $B^3$, as shown in Fig. 1. This shaft is continued upward and has reduced portions C', $C^2$, and $C^3$. Extending horizontally from adjacent the outer edge of the base or body part of the machine is an elongated bearing sleeve D in which is journaled a shaft $D'$ having removably keyed thereto at its outer end a driving gear or pinion $D^2$. This pinion meshes with a larger pinion $D^3$ mounted on the driving shaft $D^4$ the latter being provided with driving pulleys and belt shifting means of any convenient or desired type. The driving shaft $D^4$ is mounted in an offset bearing $D^5$ extending from the body of the machine. The inner end of the shaft D carries a beveled gear $D^6$ for purposes presently to be stated.

The present invention contemplates a rotatable picker deck and feed the same comprising a deck frame of spider-like structure having a central imperforate portion E, radiating arms E' spaced apart, and a central vertical sleeve $E^2$ mounted on the shaft C for rotation. The deck is supported through the pedestal part $e$, conveniently of ring formation, the lower edge of which is enlarged laterally and is formed on its lower edge with a beveled gear or rack D⁷ with which the beveled pinion D⁶ meshes. To support the picker deck in its position a hardened ring bearing $e^a$ is secured to the lower face thereof, and a ball carrying bearing E³ is supported and secured on the platform or table B³ directly below the bearing $e^a$. The bearing E³ is of ring formation and is held in its position by an upstanding flange $b^4$ on the platform B³. The supporting pedestal $e$ is conveniently bolted to the part E, thus forming a very rigid supporting structure centrally located with relation to the machine.

The outer ends of the arms E′ carry a ring shaped channel member F, the two concentric parts of which are spaced and held in their spaced relation by web members $f$, the latter being located at intervals. This arrangement constitutes substantially an endless channel and the lower edges of the two concentric members F are extended into the channel of the frame part B, forming in effect a continuation of said channel but having a rotary movement with relation thereto. Both parts F and B are concentrically arranged so that the rotation of the part F of the picker deck will be free from hindrance or impedance by the fixed channel part B. Springing from the peripheral upstanding edge of the central portion of the picker deck E are flanged members E⁴, the same being spaced and arranged at intervals throughout the circumference of the part E. Carried by these projections E³ is a feeding head G, the same being formed by a two-part casting, the lower portion $g$ being of annular formation and provided with feed throats $g'$ arranged in alinement with the space between the picker rolls presently to be described.

Extending downwardly from the throat part $g$ are the bearing portions $g^2$, the same being bolted and stepped to the upright members E⁴. Within the bearings $g^2$ are the bushing members $g^3$, $g^4$, for the roll shaft H, H′, these bearings being arranged at an inclination so that the roller shafts will be held in an inclined position. The feeding head comprises conveniently a single piece casting having an inclined receiving chamber G′ at its upper end, the latter terminating in a downwardly inclined conducting chambered part G². The inner portion of the feed head is formed with a vertical tubular sleeve member G³ and the lower and outer portions of the two sides of the head are united by the integral seed separating partitions $g^3$ of tapered formation, the space between the partitions leading to the throats $g'$. The shafts H are mounted in their respective bearings in the supporting section $g^2$ so that the one will be on a plane above the other. The lower ends of the shafts find support in the bearings $h^2$, $h^3$ mounted on the outer member of the channel ring F. The shafts H are driven by having their inner ends extending toward the center of the machine and provided with beveled gears H², while intermeshing gears H³, H⁴ are mounted on the shafts at points directly below the discharge throats of the feed head. These gears H³, H⁴ are conveniently of the same diameters and are provided at their inner ends with flanges H⁵ having upturned lips $h^5$ so that the lubricant at the bearing will be driven off from the gear hubs by centrifugal force and return to the bearings, thus preventing the oil from getting onto the surface of the picker rolls. The picker rolls are conveniently provided with rubber coatings and the throat part $i. e.$, the space between the rolls is spanned by cap plates I secured to the outer bearings and the feed throats. As above announced the picker deck is rotated and to impart rotation to the respective rolls through the gear H², a stationary annular gear J is keyed to the stationary shaft C above the plane of the beveled gears H². By this means the rotation of the picker deck carrying with it the picker rolls and their driving gearing which come in contact with the stationary gear J, causing the former to rotate as will be understood by those skilled in the art.

Fixedly mounted on the loose part C² of the shaft C is the perforated distributing base L, the same being keyed to the shaft in any convenient manner and having its lower edge fitted into the mouth of the upper edge of the chambered part of the feed head. Mounted on the distributing plate L is the hopper M, the same being provided with a series of openings $m$, registering with openings $l$ in the distributing plate L. The hopper is retained in its position on the distributing plate by any convenient means, such as a nut and washer $m'$. To lubricate the bearings for the picker deck an oil channel is formed through the shaft C, branching outwardly at its lower end at the top of the sleeve E². I have found it convenient to make the feed head of the gravity type and to provide means whereby it may be readily attached to the feed throats $g$. This is accomplished by having the lower part of the feed head overlie the throat part $g$ and to pass tie bolts therethrough at intervals. By virtue of the inclination of the picker rolls it has been advisable and convenient to provide the bushings for the outer ends of the rolls with closed ends, as at $h^6$. This not only tends to maintain the shafts in their proper position but also prevents the escape of lubricant.

From the above described detailed description it will be ascertained that there is but a single driving element which operates only on the picker deck and through it carries the feed head. All of the parts are stationary with relation to the drive, the hopper being adjusted by hand. This renders the machine exceedingly simple in construction and easily operable.

In operation the seed is fed from the hopper into the feed head, and being distributed onto the cone-shaped surface of the inclined feed hub is carried down by gravity reaching the dividing partitions $g^3$, gravity continuing to act thereon and merging somewhat into the action of centrifugal force promptly discharges the seed into the throat at the inner ends of the picker rolls. Owing to the inclination of the picker rolls the seed passes across or lengthwise thereof promptly without lag or delay while the imperfect seeds, stones and foreign matter are grasped by the rubber coated surfaces of the rolls passed between the same and discharged into the trash collecting hopper O, which latter extends below the entire machine but within and above the hopper B'. The good seeds are carried to the end of the rolls and are discharged therefrom into the channeled part F and from thence into the stationary channeled part B, whence they escape into the hopper B'. By inclining the rolls little power is required for operating the machine and the speed of rotation may be slow when treating ordinary stock. There is little liability of the seed ever being grasped in the tumbling action as it is a more rapid than centrifugal action owing to the fact that they fall over the surface of the rolls. It has been observed that a large part of the desired reduction in friction between the rolls and the stock being treated is eliminated owing to the inclination of the rolls, and in this particular it may be observed that there is a blending of both centrifugal force and gravity in the action which manifestly reduces the requisite power for driving the machine, the seed tending to ride less heavily in the picking throats of the rolls. A very elastic roll surface may be used, far more so than could be used with straight or horizontal rolls.

Having thus described the invention, what is claimed is:

1. In a seed separating machine, the combination with a base, of a series of substantially horizontally disposed rotary separating rolls, said rolls being arranged at a comparatively slight inclination from the horizontal, means for driving the rolls and for moving the same in a circular path, and means for feeding seed into the space between the rolls at the upper ends thereof.

2. In a seed cleaning machine the combination with a base, of a substantially horizontally disposed series of pairs of separating rolls slightly inclined with relation to the base, means for rotating the rolls and for moving the same in a circular path, a feed head having discharge throats leading to the space between the upper ends of the rolls, and means for carrying the head for circular movement with the rolls.

3. In a seed cleaning machine, the combination with a base, of an upright rigidly supported thereon, a picker roll deck mounted on the upright, substantially horizontally disposed picker rolls slightly inclined in a vertical direction with relation to the deck, the rolls of each pair being arranged in different horizontal planes, a feed head carried by the deck discharging into the space between the upper ends of the rolls, means for driving the rolls, and means for moving the rolls and feed in a circular path.

4. In a seed cleaning machine the combination with a rotating member with means for rotating the same, of a series of radially disposed elongated horizontally disposed picker rolls carried by the member, said rolls being slightly inclined in a vertical direction and means for feeding seed to the inner ends of the rolls and into the space between the adjacent rolls, said last mentioned means being adapted to deliver the seed to the rolls by a movement in the general direction of the rolls.

5. In a seed cleaning machine, the combination with a platform, or a centrally disposed standard, a picker deck having an elongated sleeve surrounding the standard, a pedestal adjacent the standard and provided with a gear, a bearing for the pedestal, means for rotating the gear, vertically inclined substantially horizontally disposed picker rolls carried by the deck, a stationary gear carried by the standard, and means engaging the stationary gear for rotating the picker rolls.

6. In a seed cleaning machine the combination with a base, of a fixed standard on the base, a rotatable picker roll deck mounted on the standard, means for rotating the deck, inclined bearings on the deck, elongated picker rolls supported in the bearings, a fixed gear, pinions on the picker rolls engaging the fixed gear, and a feed head having discharge throats terminating at the inner ends of the picker rolls, and said throats being adapted to discharge the seed on to the rolls in the general direction of the longitudinal axis of the rolls.

7. In a seed cleaning machine the combination with a base, a platform supported thereon, a standard projecting from the platform, a picker roll deck mounted on the base and sleeved on the standard, geared picker rolls on the deck, pinions for operating the rolls, and a stationary gearing on the standard with which the pinions engage.

8. In a seed cleaning machine the combination with a base, of a rotatable picker roll deck, elongated picker rolls extending at a slight inclination from a horizontal plane and mounted on said deck, a fixed gear, pinions connected with the picker rolls for engaging the gear, means for driving the picker roll deck, and means for feeding seed to the rolls.

9. In a seed cleaning machine the combination with a support, of an upright on the support, a picker roll deck loosely embracing the support, means for rotating the deck, a series of inclined picker rolls mounted on the deck, gears at the ends of the picker rolls, a stationary circular gear with which said other gears mesh, and an inclined feed discharging at the upper ends of the picker rolls, and in substantial alinement therewith.

10. In a seed cleaning machine the combination with elongated picker rolls arranged in pairs, with the rolls of each pair positioned in different planes, of driving mechanism for said rolls, a feed for the picker rolls comprising a continuous inclined member having feed throats at its lower edges with means for deflecting the seed into the throats, said throats being disposed to discharge on to the rolls in the general direction of the longitudinal axis thereof, a receiver at the upper end of the conical member, and means for supplying seed to the said receiver.

11. In a seed cleaning machine, the combination with an upright shaft, a rotatable deck supported to rotate with relation to the shaft, means for rotating the deck, a series of picker rolls carried by the deck, and means for driving the roll, a feed head, a continuous downwardly inclined seed conducting part, means for dividing the seed at the lower end of said head into separate streams and conducting them to the picker rolls, and a hopper located above the head.

12. In a seed cleaning machine the combination with elongated vertically inclined picking rolls and means for driving the same, of a feed head comprising a deflecting conical shaped member, and separated seed throats leading directly from the inclined surface of said member and carried thereby, said throats being adapted to discharge in the general direction of the longitudinal axis of the rolls, and at a point overlapping the inner ends thereof.

13. In a seed cleaning machine the combination with cleaning instrumentalities comprising a series of picker rolls and means for driving the same, of a feed head consisting of a chambered part, downwardly inclined portions, and discharge throats at the outer edge of said downwardly inclined portions, the said throats inclining in the same direction as said inclined portions of the head.

14. In a seed cleaning machine the combination with a supporting platform, of a standard thereon, a rotatable picker deck, means for rotating the deck, a feed head surrounding the standard and comprising a chambered part, an outwardly diverging conducting part, separate feed throats, a stationary detachable member above said receiving part, and a movable hopper above the detachable member.

15. A feed for a seed cleaning machine of the picker roll type comprising a receiving part and a downwardly inclined conducting part with inclined discharge throats at the edge of the conducting part.

16. In a seed cleaning machine the combination with picking instrumentalities, of a feed head having a downwardly and outwardly extending conducting part, and downwardly extending feed throats having division walls therein the same being secured to the lower edges of the head.

17. In a seed cleaning machine and in combination picker rolls with means for driving the rolls, bearings arranged at an incline for supporting the rolls in an inclined position, and a gravity feed for the rolls extending at an incline in the same general direction of the rolls.

18. In a seed cleaning machine the combination with a picker roll deck having upstanding parts, inner and outer bearings supported by said upstanding parts in different horizontal planes, spaced feed throats above said parts, elongated slightly inclined rollers mounted in said bearings, means for supporting the outer ends of the rollers, and a gravity feed directly to the inner end of the feed throats.

19. In a feed cleaning machine the combination with a plurality of elongated picker rolls arranged at a slight vertical inclination from a horizontal plane, of means for feeding seed to the upper ends of the rolls comprising a continuous inclined surface down which the seeds move, said surface inclining in the same general direction as the longitudinal axis of the rolls.

20. In a seed cleaning machine the combination with picking roll instrumentalities, means for driving the same, gearing interposed between the rolls, and means associated with the gearing for intercepting the passage of oil to the rolls.

21. In a seed cleaning machine the combination with a series of picker rolls, means for driving the same, intermeshing gearing between the rolls, and outstanding flanges at the inner ends of the gearing for the purpose specified.

22. In a seed cleaning machine the combination with a stepped upright, of a picker roll deck on the upright, means for driving the deck, a fixed gear on the upright, gears on the picker rolls engaging said fixed gear, a feed head loosely mounted on the upright and supported by the deck, a distributing member rigid on the upright and having openings communicating with the feed head, and a rotatable hopper mounted on the separator.

23. In a seed cleaning machine, the combination with a platform, of a centrally disposed standard, a picker deck having an elongated sleeve surrounding the standard, a pedestal adjacent the standard and provided with a gear, a bearing for the pedestal, means for rotating the gear, elongated picker rolls carried by the deck, said rolls extending at a slight vertical inclination from a horizontal plane, feeding means carried by the deck and also inclining in the same general direction and plane of the rolls, a stationary gear carried by the standard, and means engaging the stationary gear for rotating the picker rolls.

24. In a seed cleaning machine the combination with a platform, of a centrally disposed standard, a picker deck having an elongated sleeve surrounding the standard, a pedestal adjacent the standard and provided with a gear, a bearing for the pedestal, means for rotating the gear, picker rolls carried by the deck, a stationary gear carried by the standard, and means engaging the stationary gear for rotating the picker rolls.

25. In a seed separating machine, the combination of a circumferential series of picker rolls arranged in pairs, means for supporting the rolls at a slight vertical inclination from a horizontal plane, intermeshing gears between the rolls of each pair, means for imparting movement to said gears, whereby the rolls are subjected to rotatable movement about their longitudinal axes, means for imparting movement to the series of rolls about a central vertical axis, and means for feeding the seed to the inner end of the rolls at a point between the rolls of each pair, said means including an inclined surface projecting to a point overlapping the rolls at the inner end thereof.

26. In a seed separating machine, the combination of a rotatable feed head mounted to move about a vertical axis, a seed trough, said feed head having an annular part overlying the trough so as to receive seed therefrom, said annular part connecting with a downwardly and inwardly inclined part which in turn connects with a downwardly and outwardly inclined part forming a gravity feed for the seed, and a circumferential series of elongated picker rolls mounted for rotatable movement about their longitudinal axes, and means for supporting said rolls for communication with the rotatable head, said rolls extending at the same general inclination and in substantial alinement with the downwardly and outwardly inclined part of the feeding head.

27. In a seed separating machine, the combination of a circumferential series of horizontally disposed picker rolls arranged at a slight inclination downwardly toward the outer ends thereof, a support for said rolls rotatable about a central vertical axis, a gear mounted upon said axis, a gear connection between the rolls and said gear for imparting rotatable movement to the rolls about their longitudinal axes, and circumferential movement to the series of rolls about said vertical axis, and a gravity feed for the seeds arranged in end to end, association with the rolls and inclined in the same general direction as said rolls, whereby the movement of the seed from said feed to the rolls will be substantially continuous in the same general direction, said gravity feed being mounted for rotatable movement about said vertical central axes with said rolls.

In testimony whereof I hereunto affix my signature in the presence of two witnesses.

GEORGE F. CRIPPEN.

Witnesses:
WILLIAM B. HATCH,
FREDERICK C. GILLETTE.

Copies of this patent may be obtained for five cents each, by addressing the "Commissioner of Patents, Washington, D. C."